No. 843,095. PATENTED FEB. 5, 1907.
J. PEARSON.
CHUCK.
APPLICATION FILED JULY 25, 1905.

2 SHEETS—SHEET 1.

Witnesses:

Inventor.
James Pearson.
By his attorney,
F. H. Richards.

THE NORRIS PETERS CO., WASHINGTON, D. C.

No. 843,095. PATENTED FEB. 5, 1907.
J. PEARSON.
CHUCK.
APPLICATION FILED JULY 25, 1905.

2 SHEETS—SHEET 2.

Witnesses:

Inventor:
James Pearson
By his attorney,
F. H. Richards.

UNITED STATES PATENT OFFICE.

JAMES PEARSON, OF CLEVELAND, OHIO, ASSIGNOR TO THE WARNER & SWASEY COMPANY, OF CLEVELAND, OHIO, A CORPORATION OF OHIO.

CHUCK.

No. 843,095.  Specification of Letters Patent.  Patented Feb. 5, 1907.

Application filed July 25, 1905. Serial No. 271,149.

*To all whom it may concern:*

Be it known that I, JAMES PEARSON, a citizen of the United States, residing in Cleveland, in the county of Cuyahoga and State of Ohio, have invented certain new and useful Improvements in Chucks, of which the following is a specification.

This invention relates to chucks; and the object of the present invention is to provide an improved chuck especially adapted for use on the spindles of turret-lathes and similar metal-working machines and to provide a chuck the movable jaws of which are operated by a longitudinally-movable contractor associated with adjusting and operating devices by which the jaws may be operated reliably and with precision and the jaws given a strong and powerful hold upon the work by the application of a minimum amount of force to the operating devices. These objects are accomplished by means of devices so organized that the working position of the jaws and a contractor for operating the jaws may be readily adjusted from time to time as required, such mechanism being contained in a strong and rigid chuck-body occupying a relatively small space, and this without the impairment of power and efficiency of action of the various operative details comprised in the complete chuck mechanism and wherein the length of the chuck is comparatively short.

Figure 1:
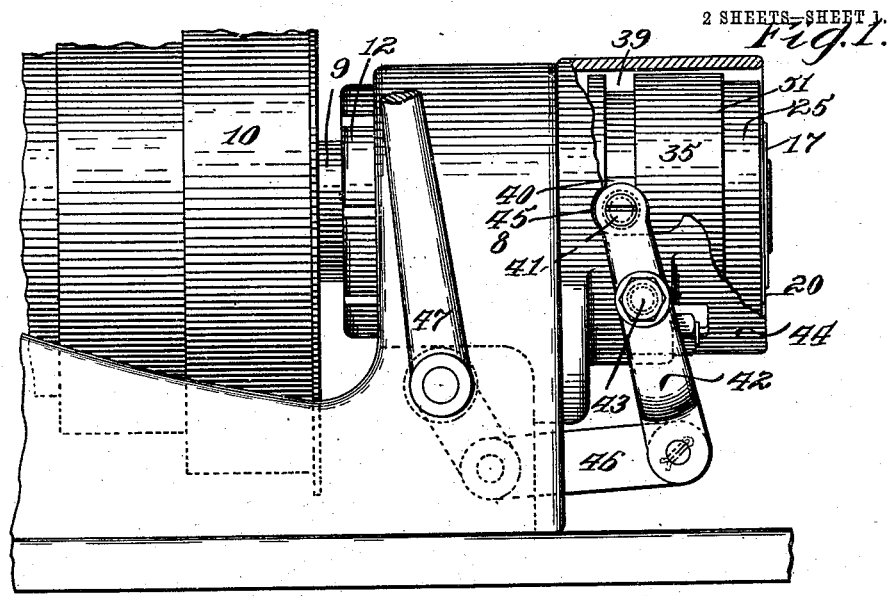
Figure 2:
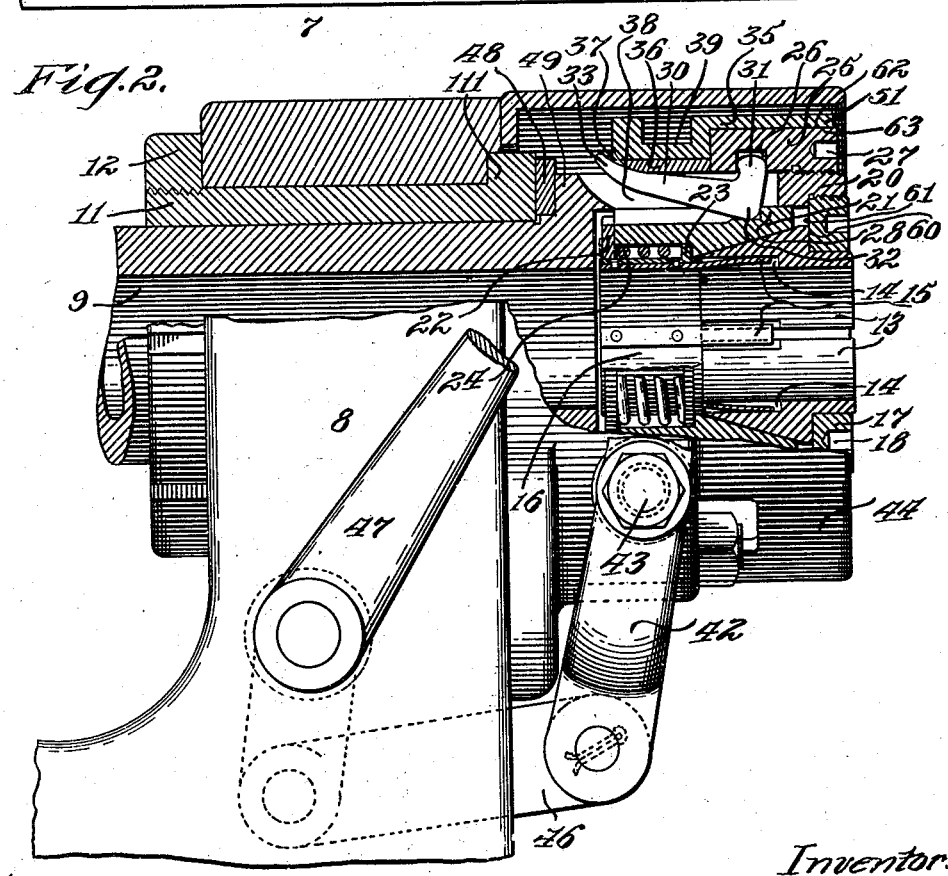
Figure 3:
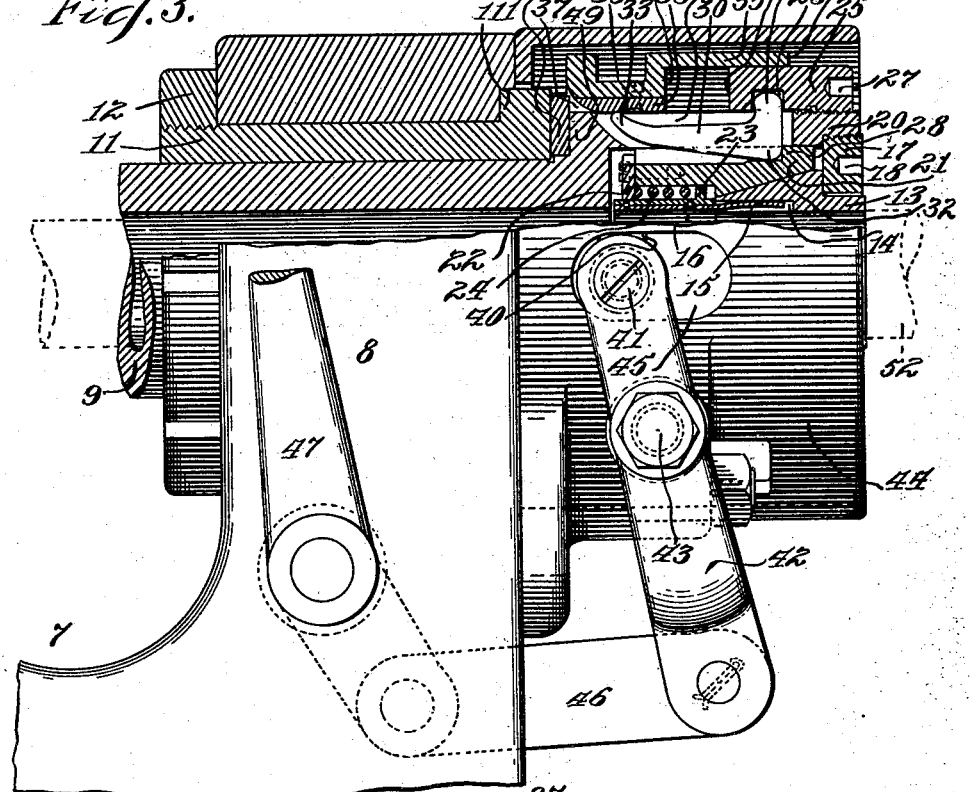
Figure 4:
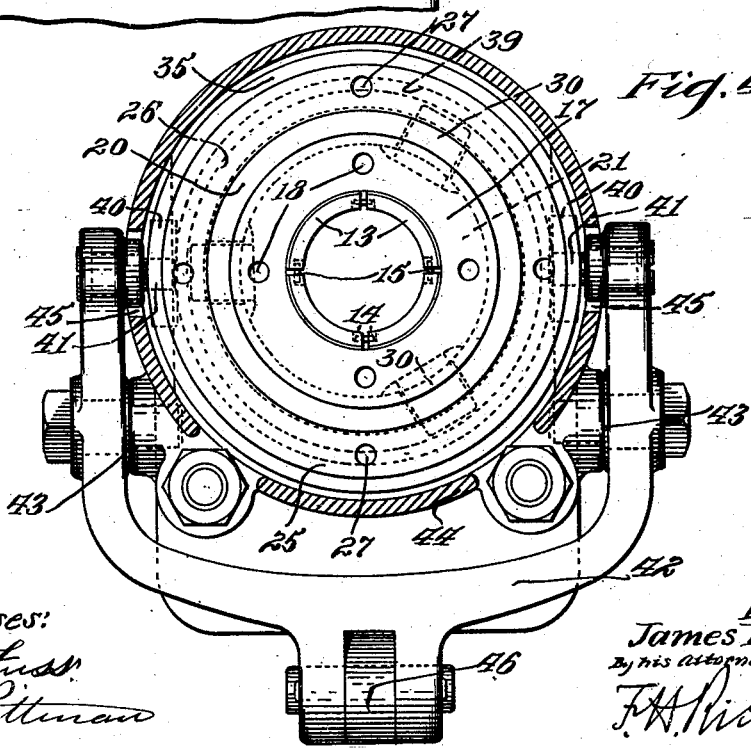

In the drawings accompanying and forming a part of this specification, Figure 1 is a side elevation of a chuck made in accordance with my present invention and shown applied to the hollow spindle of a metal-working machine. Fig. 2 is an enlarged view similar to Fig. 1, but showing a chuck mechanism partially in section for illustrating the organization of the operative details thereof. In this view the contractor is shown retracted toward the left-hand for opening the jaw. Fig. 3 is a view similar to Fig. 2, showing the operative details in a different position, as when closing the jaws onto a rod or bar held therein; and Fig. 4 is an elevation as seen from the right hand in Figs. 1, 2, and 3, some parts being shown broken away for more clearly illustrating certain features of the mechanism.

Similar characters refer to like parts throughout the specification.

Certain portions of a metal-working-machine framework are illustrated herein and designated in a general way by 7 and carry a bearing-support 8 for the hollow spindle 9 of the metal-working machine, which spindle may be driven in any suitable manner, as by means of a cone-pulley 10. The spindle is shown as mounted in a suitable bushing 11, having a shoulder 111 abutting one side of the bearing portion 8 and fastened in place by means of a screw-ring 12 abutting the other side. The forward end of the spindle constitutes the chuck-casing, as it were. This present chuck is illustrated as made in accordance with what is now regarded as good practice in having the chuck-casing formed integrally with the spindle. Chucks of this character are generally subjected to rather hard use, since they are frequently employed for use upon comparatively large and heavy stock, and where the chuck casing or body is fastened as by screwing upon the end of the spindle there is not that rigidity which is present when the parts are integral. A suitable antifriction device 48 may be placed between the abutment 111 on the bushing 11 and an abutment 49 on the spindle or the chuck-head.

The jaws (designated by 13) are mounted on the chuck-casing, which jaws in the present instance are four in number and adapted for radial movement for clamping and releasing the work. The jaws are shown provided with chambers 14 for receiving spring-arms 15 for holding them in their outward position. The spring-arms are carried by a ring 16, seated in a chamber in such casing portion. The forward end of the ring abuts the rear ends of the jaws, and the jaws are held in place from forward displacement by means of a screw-ring 17, adapted to be operated by a suitable spanner engaging holes 18 therein, the screw-ring being screwed in the forward portion 20 of the chuck-body proper, which is shown as of relatively small thickness. The back faces of the jaws are shown tapering and together constitute a frusto-conical formation, which is adapted to be engaged by a frusto-conical cavity in the contractor member or ring 21, which carries at its back end a ring 22, constituting a flange between which and a flange 23 on the ring 16 an extension-spring 24 is interposed for withdrawing the contractor from its operative position into an idle position and into such a position relative to the jaws that the same may yield to the spring-arms and be pressed away from the work. The spring also forces the ring 16, and through it the jaws, forward, bringing the jaws against the rear face of the ring 17. The outer surface of the body portion 20 is screw-threaded, and upon which screw-threads is mounted a fulcrum-ring 25, which has a channel 26 for receiving the fulcrum ends of the operating-levers. The fulcrum-ring may be shifted longitudinally of the chuck, it being provided with spanner-holes 27 for rotating it to accomplish such purpose. The contractor-ring is shown provided with an abutment 28 near its forward end, which is adapted to be engaged by a suitable number of levers 30, each having a fulcrum 31, entering the fulcrum-groove, and an end 32, engaging the abutment 28. The levers are each provided with a longer end 33, which ends will be engaged by some suitable device for pressing them inwardly, in the present instance in a radial direction, for forcing the contractor-ring or its frusto-conical face up the rear or frusto-conical faces of the jaws for closing the same upon the work. It will be seen that the longer arm of the lever is relatively long compared with the shorter arm and that the point of application of the force of power for working is comparatively remote from the fulcrum, making a longer arm than it is generally possible to employ in this class of mechanism. The actuator in the present instance comprises a ring or slide 35, engaging the cylindrical exterior of the ring 25, but adapted to slide longitudinally thereon. It is shown provided with hardened wearing-plates 36 for engaging the longer arms of the levers. Such plates may be set into recesses 37 and fastened by some suitable means—as, for instance, screws. When the actuator is shifted longitudinally toward the left in the present illustration, the portions for engaging the levers will ride up the longer arms thereof, and as the clamping of the rod progresses the leverage will increase, and upon the completion of the clamping when the parts are properly adjusted the points of the arms will be engaged by the actuator-ring. The levers 30 are also mounted in recesses 38 in the chuck-body, so that the rotation of the rings 17 or 25 will not affect their angular position. It will be observed that the actuating-lever engages the contractor-ring near its forward end and largely overlies such contractor-ring and that the actuator device overlies the jaws, the contractor-ring, and the levers, making a compact structure occupying but a small space longitudinally of the chuck. The actuator is shown provided with a groove 39, which is engaged by slides 40, mounted on pins 41, carried by an actuator-lever 42, pivoted at 43 to the casing 44, which is utilized for supporting the lever connections for operating the chuck mechanism. The pins 41 are shown projecting through slots 45 in such casing. The actuating-lever 42 may be connected by a link 46 with a lever 47, pivoted to the support 8, so that upon swinging this lever in one direction or the other the chuck may be opened or closed. The lever may be either a hand-lever or connected to some automatic controlling device, as occasion may demand.

One of the leading features of the present improvement relates to the manner of locating and operating the levers whereby these take hold of the contractor at a point near the forward end of the contractor, by which means the lever is brought into substantially the same position longitudinally of the spindle—that is, of the chuck-body portion of the spindle—as the space which is occupied by the contractor itself. Thus the contractor and the lever while occupying substantially the same longitudinal position in the chuck require together but a short distance or space in which they are received or contained.

A further feature of marked importance in this improvement is the ring 25, which constitutes a fulcrum-ring for the levers and a strengthening-band for the slotted chuck-body portion of the spindle. In order to bring the various parts into such proportions as will render them suitable for coacting with each other in a highly-efficient manner, it is necessary in practice to reduce to a relatively small thickness diametrically of the spindle the projecting portion 20, which constitutes the chuck-body proper. One practical reason for this is the necessity of reducing the short arm 32 of the lever 30 to a small dimension, so that a sufficient amount of leverage will be obtained by the use of the long arm 33 of the lever when this is of a length a little more than the length of the contractor itself. These objects are accomplished by mounting the reinforcing-ring 25 by closely fitting the same to be screwed on the outside of the chuck-body 20, so that on screwing this ring forward or backward it will, by reason of this engagement at 26 with the fulcrum end 31 of said lever 30, operate to bodily shift the levers forwardly or backwardly within the chuck-body, as may be required. This organization and mode of adjustment of the contractor mechanism relatively to the jaws 13 and the jaw-locating ring 17 provides also for locating the recesses 37 of the operating-ring 35 directly upon the outer side of the chuck-body immediately at the rear of said reinforcing-ring 25, and for the purpose of lengthening the bearing of said operating-ring upon the chuck mechanism, so it will operate properly in practice with only two operative devices, as shown at 40, the said operating-ring is shown provided with a forwardly-extending sleeve 51, substantially corresponding in length with the width of said reinforcing and fulcrum ring 25 and arranged to fit closely but freely thereon. By this means, as I have found in practice with full-sized working machines made in accordance with this improvement, the perfect operation of the said operating-ring is secured, while providing for readily adjusting the apparatus to suit a considerable variation in the size of the stock. (Indicated by the dotted lines 52, Fig. 3.) The longitudinal adjusting of the ring 25 shifts the levers 30, and thereby their operative relation to the contractor-ring. It will be seen, however, that such adjusting does not vary the relative length of arms of said lever. By locating the fulcrum of the said operating-lever 30 within the groove 26 of the reinforcing-ring 25 the resistance of said lever is applied first to the short arm of said operating-lever about said ring 25 and is finally retransmitted through this ring into the chuck-body through the extended and closely-engaging screw-thread by which the ring engages said chuck-body. By this means the pressure of the lever, which is sometimes of a very large amount as compared with the dimensions of the working part of the chuck, is first received by the reinforcing-ring, which will of course be somewhat sprung or flexed by such pressure. This, it will be noted, provides for so transmitting said forces to the chuck-body through an intervening member and constituting a reinforcement of the chuck body as to relieve such chuck-body from the flexure which would otherwise occur therein if the said levers were fulcrumed directly thereon, and this result I obtain through the same intermediate member, the reinforcing or fulcrum ring 25 which I employ for reinforcing the chuck-body and for securing the necessary longitudinal adjustment of the contractor apparatus therein.

The parts of the chuck must be so constructed that they can be entirely and readily disassembled without removing the spindle from its bearings. It will be apparent that such disassemblage may be had in the present instance by removing the ring 17. The jaws may then be removed. The contractor-ring and jaw-springs may be permitted to remain in place, or they may be removed through the space left open by the removal of the ring 17. The general character of the jaw and the spring means for opening the same herein illustrated is the same as that shown in Letters Patent to Pearson, No. 790,656, dated May 23, 1905, for automatic chuck. The ring 25 may also be removed and the actuator member taken out. The levers for actuating the contractor-ring may be taken out after the removal of the jaws and such contractor-ring. For cleaning and repairs it is found that a large amount of time and labor will be saved by having the parts so organized that they may be readily disassembled while the spindle remains in its normal position in its bearings.

In my above-referred-to patent to Pearson the actuating device is controlled by a lever at the back end operating upon the contractor-ring through the intermediary of a quill. In many machines—as, for instance, turret-lathes—the work is fed by a roller-feed, which is located at about the place where the operating-levers are desired to be located for actuating the parts through this quill mechanism or other connector; but by placing the actuating-levers upon the front side of the bearing it leaves such other side free for the feed mechanism which may be employed.

It will be seen that the abutting faces at 60 and 61 on the jaws and ring 17, respectively, may be ground down to precisionize the position of the jaws and that the face 62 of the ring 25 may be ground to abut a similarly-ground face 63 upon the operating-ring. The longitudinal adjustment of the ring 25 affords an adjustable precision-face, and by this means before each actuation the parts will be brought to their proper outward and concentric positions, so that at their next actuation they will be in condition to properly grasp the work for holding it in its accurate position.

The jaws by means of the precisionized faces 60 and 61 are constrained to move in a radial plane, so that the work in being grasped by them will not be changed in its longitudinal position. The machine-tools using chucks of this class are frequently used in such manner that the end of the stock is fed up against some tool or other abutment and then the jaws fastened down upon it. This brings the end of the stock against such tool or abutment for the purpose of measuring off the length of the piece which is to be made upon the machine, and if the jaws in engaging the stock move it longitudinally in either direction the output of the machine will be variable in length, which is of course undesirable; but by moving the jaws accurately in a plane radial of the axis of the stock-bar their clamping will be effective to maintain such stock-bar in the position to which it has been advanced by the feed.

From the foregoing general description the operation of the chuck may be deduced; but for the purpose of greater clearness the operation will be described, assuming the various parts to be in the positions illustrated in Fig. 2—that is, with the jaws open and the lever 47 thrown toward the right-hand end. The stock (designated by dotted line 52 in Fig. 3) will be advanced by some suitable feed device, and in the present instance by the lever 47, toward the left. The lever 42 will be shifted upon its pivot and by means of the pins 41 will move the slides 40 toward the left, which will longitudinally shift the actuator device 35 and cause the engaging surfaces, in the present instance plates 36, to ride up the longer arms 33 of the levers 30, turning them upon their fulcrums 31, seated in the fulcrum-groove 26, and cause the shorter arms 32 of such levers to engage the abutment 28 upon the forward end of the contractor-ring, forcing the same over the rear faces of the jaws and causing the same to contract upon the stock. The precision-faces 60 and 61 will be placed into engagement upon the first advance of the contractor-ring and before the jaws have strongly engaged the work, whereby the movement of the jaws will be in a true radial plane, clamping down upon the work without longitudinally shifting the same. Upon throwing the operating-lever toward the right-hand side the actuating device 35 will be moved so that the faces 62 and 63 come into engagement, and the spring 24 will withdraw the contractor-ring and permit the springs 15 to unclamp the jaws from the work. When it is desired to change the operative position of the levers 30 relative to the abutment 28, the ring 25 will be rotated in the manner above referred to, which will change the longitudinal position of the fulcrum-groove 26.

It will be seen that the jaws, the contractor-ring, the levers, and their actuator-ring all occupy positions in the same longitudinal zone. Some of them, however, are of slightly-different lengths than are others; but in the main they are arranged so that one practically overlies the other, and they are all practically in the same longitudinal zone axially of the spindle or the chuck, since the spindle at this region becomes a part of the chuck forming its body. By having the parts thus located in the same longitudinal zone there is avoided an accumulation of length which would be present were the parts spread out longitudinally of the axis of the chuck. One of the features sought in this class of chuck is to shorten the chuck and bring the jaws as near the bearing of the spindle as possible.

Having described my invention, I claim—

1. The combination with a hollow lathe-spindle and a chuck-body integral therewith, of jaws carried by the chuck-body, a ring mounted within the chuck-body for limiting the forward longitudinal movement of the jaws, means for elastically pressing the jaws against said ring, a longitudinally-movable contractor for the jaws and having a shoulder at its forward end, a ring mounted upon the outside of the chuck-body, for reinforcing the same, and having fulcrum-seats formed upon it, said chuck-body having recesses for levers, levers mounted in said recesses and each having one end engaging the said shoulder, and means for rocking said levers.

2. The combination with a hollow lathe-spindle and a chuck-body integral therewith of jaws within the chuck-body having sloping outer faces, a contractor within the chuck-body and having a face for engaging said sloping faces on the jaws for closing said jaws, and having an abutment at its forward end, a system of levers engaging said abutment on the contractor, means for affording a fulcrum for said levers radially of the jaws and substantially radially of said abutment, and means for actuating said levers for shifting said contractor into operative engagement with said jaws.

3. In a chuck, the combination with a chuck-body, of jaws mounted therein and movable in radial paths, a longitudinally-movable contractor within the body for actuating the jaws, a longitudinally-adjustable reinforcing-ring upon the outside of the body and in the same longitudinal zone with the jaws axially of the chuck and having, in line with the path of movement of the jaws, a fulcrum-support for a lever, a lever having one end fulcrumed in such support, the contractor having, at its forward end and also in line with said path, a shoulder abutted by one end of said lever, the lever overlying the contractor, and means for engaging the other end of the lever for turning it on its fulcrum and causing it to shift the contractor.

4. In a chuck, the combination with a spindle, of jaws mounted on the spindle and means for actuating the same, a bearing for the spindle, a casing carried by and fast with the bearing and surrounding said jaws, and operating-levers carried by said bearing and casing and operatively connected with the jaw-actuating means.

JAMES PEARSON.

Witnesses:
HARRY E. WETHAM,
W. M. ALLEN.